United States Patent [19]

Vaughn

[11] Patent Number: 4,551,831
[45] Date of Patent: Nov. 5, 1985

[54] TIME DIVISION MULTIPLEXED SYSTEM FOR NON REAL TIME DIGITAL SWITCHING

[75] Inventor: Mitchell D. Vaughn, Garland, Tex.

[73] Assignee: USDATA Corporation, Richardson, Tex.

[21] Appl. No.: 575,581

[22] Filed: Jan. 31, 1984

[51] Int. Cl.⁴ .............................................. H04Q 11/04
[52] U.S. Cl. .......................................... 370/58; 370/54
[58] Field of Search ............................. 370/58, 67, 54

[56] References Cited

U.S. PATENT DOCUMENTS

| | | | |
|---|---|---|---|
| 2,917,583 | 12/1959 | Burton et al. | 370/67 |
| 2,936,337 | 5/1960 | Lewis | 370/67 |
| 2,936,338 | 5/1960 | James et al. | 370/67 |
| 3,997,727 | 12/1976 | Platts et al. | 370/58 |

*Primary Examiner*—Douglas W. Olms
*Attorney, Agent, or Firm*—Jerry W. Mills; Gregory Howison

[57] ABSTRACT

A communications network includes a system multiplexer (10) for effecting communication channels between a plurality of peripheral units. The peripheral units include master computers (12), (14) and (16) and various slave devices such as printers (28) and display terminals (26). The multiplexer (10) includes a receive multiplexer (30) and a transmit multiplexer (32) connected together through a communications link (34). The multiplexers are controlled through control logic circuitry (36) which receives signals from a CPU (42). The CPU (42) stores a connection pattern in the control logic circuitry (36) and alters this connection pattern to change the communications link between various peripheral devices. By multiplexing the channels, real time communication is achieved.

9 Claims, 7 Drawing Figures

TIME DIVISION MULTIPLEXED SYSTEM FOR NON REAL TIME DIGITAL SWITCHING

TECHNICAL FIELD OF THE INVENTION

The present invention pertains in general to a communications network and, more particularly, to a multiplexed network for allowing real time communication between master and slave communication devices.

BACKGROUND OF THE INVENTION

Intelligent communications within a local-area network (LAN) of computers and associated peripherals and terminals depends on both the type of hardware utilized to effect the communications link and also on the modes of behavior, or protocols. A number of different techniques are utilized to effect the communications link and transfer information over the network. These techniques generally utilize a contention accessing scheme, a token-passing accessing scheme or a ring network. Each of these schemes utilizes a common communications link with an intelligent controller to control the data flow between units. A disadvantage to this is that the communication is not real time and requires data to be placed in packets and then transmitted when the communications link is free. Each of these packets, termed Protocol Data Units (PDU), contain some type of address field and control field. These fields designate the destination service access point and also the originating peripheral device. A disadvantage to these types of systems is that they do not operate in real time.

One type of scheme for accessing data packets from a local network is carrier-sense multiple access with collision detection (CSMA-CD). The CSMA-CD is a random access scheme in which a node competes with other nodes for the use of the network (multiple access). Before a node can transfer the message, it must first listen to the desired channel to make sure that it is not busy. The node recognizes a busy channel by detecting the presence of a carrier frequency. If busy, the node cannot transmit until the channel is clear. Once transmission starts, the node must monitor the channel again to make sure that no other nodes are transmitting on the channel at the same time. If messages do collide, the transmission is aborted and the node waits or backs off for a random period of time before it attempts retransmission.

The CSMA-CD system is defined in the Institute of Electrical and Electronics Engineers (IEEE) Standard IEEE-802. This standard applies to baseband coaxial-cable transmission, single channel baseband or multi-channel broadband modes. Depending upon the type of mode utilized, the signalling rate will vary. However, all the interfaces used with the network must support a given signal rate. These interfaces are defined by standards such as RS-442, RS-232-C and RS-449 interfaces which are standard interfaces of the EIA (Electronic Industries Association).

In view of the above disadvantages, there exists a need for a communications network that interconnects peripherals in a communications network for real time communication and overcomes speed limitations of standard interface devices.

BRIEF DESCRIPTION OF THE DRAWINGS

For a more complete understanding of the present invention and the advantages thereof, reference is now made to the following description taken in conjunction with the accompanying Drawings in which.

SUMMARY OF THE INVENTION

The present invention comprises an apparatus and method for controlling communications paths between a plurality of communications devices in a network. The apparatus includes a time division multiplexer with a plurality of inputs and a plurality of outputs which is operable to connect the inputs thereof to select ones of the outputs thereof in accordance with a predetermined connection pattern. A control circuit controls the operation of the multiplexer in accordance with the predetermined pattern. The controller generates the predetermined pattern in response to destination data transmitted by the peripheral communication devices that have data to transmit to a select other of the communications devices. The transmission of data over the communications links is monitored when the transmission is complete and then the predetermined pattern is altered to disconnect this link and open the channel such that another communications device can interface with this communications device.

In another embodiment of the present invention, a timing circuit is provided for timing the duration of time that any of the communications devices are interfaced together in a communications link such that none of the devices can occupy one communications link after the predetermined duration of time. In order to effect a communications link, the control circuit interfaces with each of the communications devices to determine if a request to send information is present in the transmitting data. The control circuit then determines if the requested communications device is occupying a communications link and, if not, the prdetermined pattern is altered to effect a communications link with the requested device. If the requested communications device is occupying a communication link, the requesting communication device is placed in a Que and a communications link is effected after the requested communications device is free.

In yet another embodiment of the present invention, a method for controlling the communications paths includes first transmitting destination data from each of the communications devices that have data to transmit. The destination data is then sensed and the requested communications device determined. The connecting pattern is then generated to determine the communications links between various communications devices in accordance with the destination data. The communications links are then time domain multiplexed such that transmission of data occurs in real time.

DETAILED DESCRIPTION OF THE INVENTION

Figure 1:
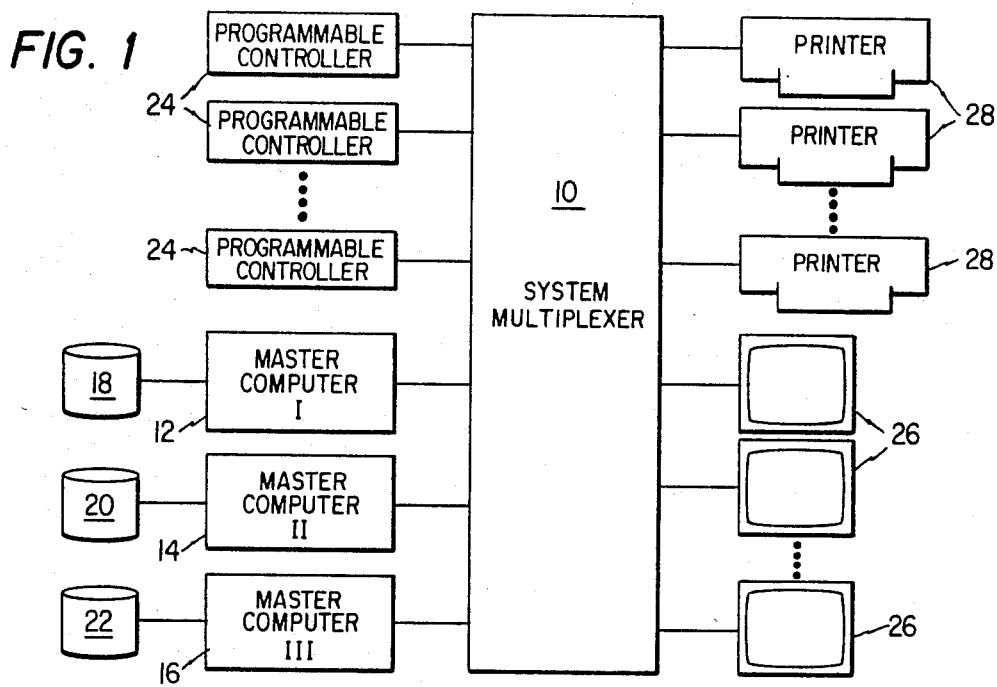
FIG. 1 illustrates a block diagram of a communications network utilizing a multiplexer in accordance with the present invention.

Referring now to FIG. 1, there is illustrated a block diagram of a communications network in accordance with the present invention. The network includes a system multiplexer 10 for effecting communications links between devices connected thereto. A master computer 12, a master computer 14 and a master computer 16 are interfaced with the system multiplexer 10. The master computer 12 is labeled with the Roman Numeral I, the master computer 14 is labeled with a Roman Numeral II, and the master computer 16 is labeled with a Roman Numeral III. The Roman Numerals I–III represent the priority of the master computers 12–16 with the master computer 12 having the highest priority. Storage disk mechanisms 18, 20 and 22 are connected to the master computers 12–16, respectively.

A plurality of program logic controllers (PLC's) 24 are connected to the system multiplexer 10 and a plurality of display terminals 26 are also interfaced with the system multiplexer 10. The displays 26 can consist of either a receive only display or a display terminal which has a capability of having data input thereto for transmission through the system multiplexer 10. A plurality of printers 28 are also interfaced with the system multiplexer 10.

All of the peripheral devices attached to the system multiplexer 10 are either slave or master devices or a combination thereof. For example, the master computers 12–16 are generally considered to be master units which generate data for transmission to other peripheral units. However, one master computer can transmit data to another master computer with the receiving master computer then acting as a slave device. Generally, the printers 28 and the displays 26 act as slave units which are selected by the master devices for transmission of data thereto.

In operation, the system multiplexer 10 effects communications links between various master units and select slave units. To effect these communications links, the system multiplexer 10 interfaces with the master units to determine which of the slave devices they desire to communicate with. After determining this, the system multiplexer 10 creates a connection pattern which defines the communications links between various master units and slave units. Once this connection pattern is determined, the master units are time domain multiplexed to the proper slave units. In this manner, data transmission over the communications links is done in real time without the necessity for storing data in packets and transmitting them along a common communications channel when that common communication channel is free of data.

Figure 2:
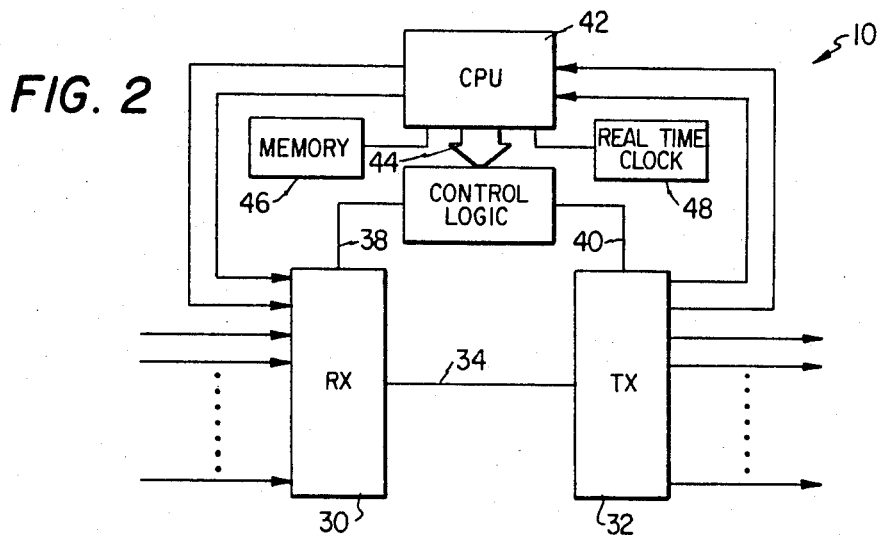
FIG. 2 illustrates a block diagram of the multiplexer of the present invention.

Referring now to FIG. 2, there is illustrated a block diagram of the multiplexer 10. The multiplexer 10 includes a receive multiplexer 30 and a transmit multiplexer 32. Receive multiplexer 30 is labeled RX-MUX and the transmit multiplexer 32 is labeled TX-MUX. The receive multiplexer 30 is interfaced with the transmit multiplexer 32 through a single communications link 34. In the preferred embodiment, the receive multiplexer 30 has 16 inputs or input ports and the transmit multiplexer 32 has 16 outputs or output ports. The receive multiplexer 30 is operable to interface one of the 16 inputs thereof to the communications link 34 during one sample period and the transmit multiplexer 32 is operable to connect the communications channel 34 to one of the 16 outputs thereof during the same sample period.

A control logic circuit 36 is connected to the receive multiplexer 30 through a control line 38 and to the transmit multiplexer 32 through a control line 40. The control logic circuit 36 controls which of the receive multiplexer 30 input ports is connected to the communications channel 34 during a given sample period and which of the transmit multiplexer 32 output ports are connected to the communications channel 34 during that same sample period.

A central processing unit (CPU) 42 is interfaced with the control logic circuit 36 through a signal bus 44. The CPU 42 is a standard microprocessor-based central processor such as Model Z-80A manufactured by Intel Corp. The CPU 42 has a memory 46 and a real time clock 48 attached thereto. The real time clock 48 is operable to provide information as to the time of the day and the date on a real time base.

The CPU 42 is interfaced with two of the output ports of the transmit multiplexer 32 and two of the receive multiplexer 30 input ports. In this manner, any one of the remaining input ports on the receive multiplexer 30 can be interfaced to the CPU 42 and the CPU 42 can transmit data to the communications channel 34 through the receive multiplexer 30 for multiplexing with any of the output ports on the transmit multiplexer 32.

The CPU 42 provides the intelligence for the multiplexer 10 and determines which input ports of the receive multiplexer 30 are connected to which output ports of the transmit multiplexer 32 for any given sample. This is defined by a "connection pattern" which is a pattern defining the realtionship between the input ports of the receive multiplexer 30 and the output ports of the transmit multiplexer 32 for a given sample period in one frame of a time domain multiplex scheme.

For example, the receive multiplexer 30 has 16 input ports and the transmit multiplexer 32 has 16 output ports, of which fourteen of the input ports and fourteen of the output ports are available for interface with the peripheral devices. One connection pattern can have the 15th input port of the receive multiplexer 30 interfaced with the 3rd output port of the tansmit multiplexer 32. In one frame of the time domain multiplexing scheme, all of the output ports of the transmit multiplexer 32 are stepped through, thus requiring 16 sampling periods during each frame. When the third sample period has arrived, the transmit multiplexer 32 is controlled to connect the third output port to the communications channel 34 and the receive multiplexer 30 is controlled to connect the communications channel 34 to the fourteenth input port thereof. As long as the connection pattern is not altered, each frame of the time domain multiplexing scheme will effect this connection or communications link.

In order to determine the connection pattern, the CPU 42 samples all of the ports of the receive multiplexer 30. In this manner, a transmission on these input ports can be monitored and also requests for transmissions are received by the CPU 42. When data is initially transmitted on these input ports according to a protocol which requests a connection to a particular slave device, the CPU 42 recognizes this and alters the connection pattern. On the next frame of the time domain multiplexing scheme, the connection pattern is altered and the appropriate communication link according to the request is made. However, there may be situations where the requested slave device is already occupying a communications link, that is, it is "busy". In this situation, the CPU 42 places the requesting peripheral device in a Que and connects it when the requested slave device is free. This will be described in more detail hereinbelow.

Figure 3:
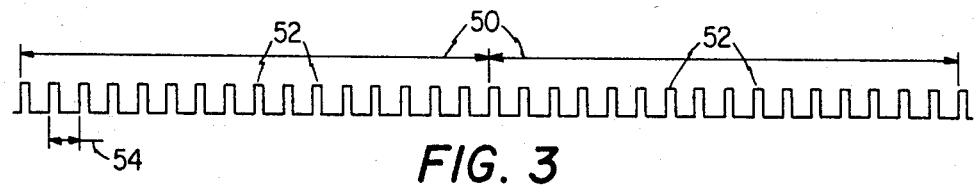
FIG. 3 illustrates a timing diagram for two multiplex frames.

Referring now the FIG. 3, there is illustrated a timing diagram for two frames of the time domain multiplexing scheme. The time domain multiplexing frames are illustrated by vertical dotted lines with the distance therein represented by double sided arrows 50. Each of the frames has 16 sample periods represented by sample pulses 52. The distance between two adjacent sample pulses 52 is represented by a reference numeral 54 and is constant for all of the sample pulses 52. During the duration of the sample pulse 52, the selected output port on the transmit multiplexer 32 is connected to the selected input port of the receive multiplexer 32. Therefore, each output port on the transmit multiplexer 32 is connected to the selected input port of the receive multiplexer 30 for the duration of a sample pulse 52 for each frame of the time domain multiplexing scheme. In the preferred embodiment, the baud rate for sampling pulses 52 is three megahertz and the repetition rate for each of the frames 50 is 187 KHz. In this manner, the CPU 42 only has to operate at the frame rate, whereas the multiplers 30 and 32 are operated at a frequency that is sixteen times higher. The rate at which data can be transmitted is determined by conventional sampling theory techniques which is determined by the baud rate of the transmitting data and the type of communication. In the preferred embodiment, the transmitted data is either Binary or ASCII.

Figure 4:
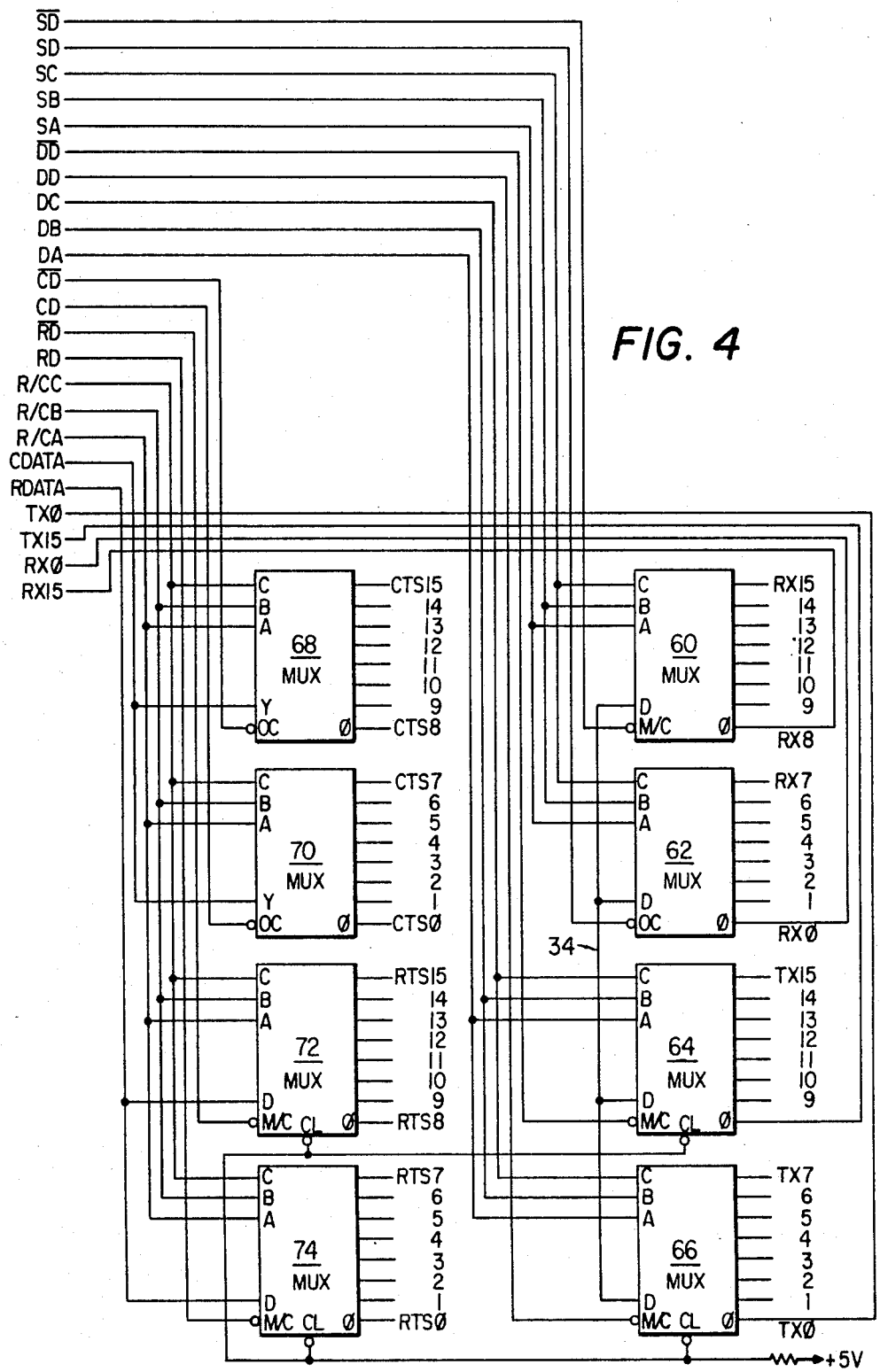
FIG. 4 illustrates a schematic diagram of the multiplexer in accordance with the present invention.

Referring now to FIG. 4, there is illustrated a schematic diagram for the receive multiplexer 30 and the transmit multiplexer 32. The receive multiplexer 30 is comprised of an 8-input multiplexer 60 and an 8-input multiplexer 62. Both of the multiplexers 60 and 62 have three state outputs. The select inputs of the multiplexers 60 and 62 are connected to the first three bits of a 4-bit source control word with the first bit labeled SA, the second bit labeled SB, the third bit labeled SC and the fourth bit labeled SD. The Enable input of the multiplexer 62 is connected to the fourth bit of the source control word and the Enable input of the multiplexer 60 is connected to the inverse of the bit SD. Therefore, the fourth bit of the source control word selects one of a combined 16 input ports of the multiplexers 60 and 62. The output of the multiplexers 60 and 62 is connected to the communications link 34.

The transmit multiplexer 32 is comprised of two 8-bit addressable latches 64 and 66. Each of the addressable latches 64 and 66 has a 3-bit select input and an Enable input. The 3-bit select inputs of the multiplexers 64 and 66 are connected to the first three bits of a 4-bit destination control word having the first bit labeled DA, the second bit labeled DB, the third bit labeled DC, and the fourth bit labeled DD. The fourth bit labeled DD of the destination control word is connected to the Enable input of the multiplexer 66 and the inverse of the fourth bit is connected to the Enable input of the latch 64. The data inputs of the latches 64 and 66 are connected to the communications link 34 to receive the outputs from the multiplexers 60 and 62. Therefore, the logic state of the destination control word determines which of the these combined 16 outputs of the latches 64 and 66 will be interfaced with the communication link 34.

In order for the CPU 42 to recognize that a particular one of the peripheral devices is requesting a communications link, a request to send (RTS) signal is transmitted by that device. The CPU 42 is interfaced with each of the peripheral devices to receive this RTS signal. After reception of an RTS signal from a particular one of th peripheral devices, a clear-to-send (CTS) signal is sent back to that peripheral device. Data transmission is then initiated and the CPU 42 monitors the transmitted data from that peripheral device to determine the particular peripheral device that it desires to communicate with. This information is contained in the address data which is part of the protocol for the tansmitting peripheral device. In response to receiving this address, the CPU 42 checks the status of the requested slave device to determine if the requested slave device is available for transmission of data thereto. If the requested slave device is available, an acknowledge signal is then transmitted back to the requesting device.

In order for the CPU 42 to monitor all of the peripheral devices for RTS signals and to return CTS signals thereto, a multiplexer is required. The preferred embodiment, as described above, provides for fourteen peripheral devices. To accommodate this, a multiplexer is formed that includes two 8-input multiplexers 68 and 70 which have 3-bit select inputs. The 3-bit select inputs of the multiplexers 68 and 70 are connected to the first three bits of a control word having the first bit thereof labeled R/CA, the second bit labeled R/CB, the third bit labeled R/CC, and the fourth bit labeled R/DD. The Enable input of the multiplexer 70 is connected to the fourth bit labeled R/DD and the Enable input of the multiplexer 68 is connected to the inverse of the fourth bit. The data outputs of the multiplexer 68 and 70 are connected to a line labeled CDATA which is input to the CPU 42 for interface therewith.

The RTS signals also require a multiplexer which is formed from two 8-bit addressable latches 72 and 74. The latches 72 and 74 have 3-bit address inputs that are connected to the same control word that the 3-bit select inputs of the multiplexers 68 and 70 are connected to. The inputs of the latches 72 and 74 are connected to a data line labeled RDATA.

As long as a peripheral device is transmitting, a CTS signal is supplied and monitoring of this signal supplies the CPU 42 with a signal indicative of an ongoing transmission. When the CTS signal is removed, the CPU 42 recognizes this and changes the connection pattern.

Figure 5:
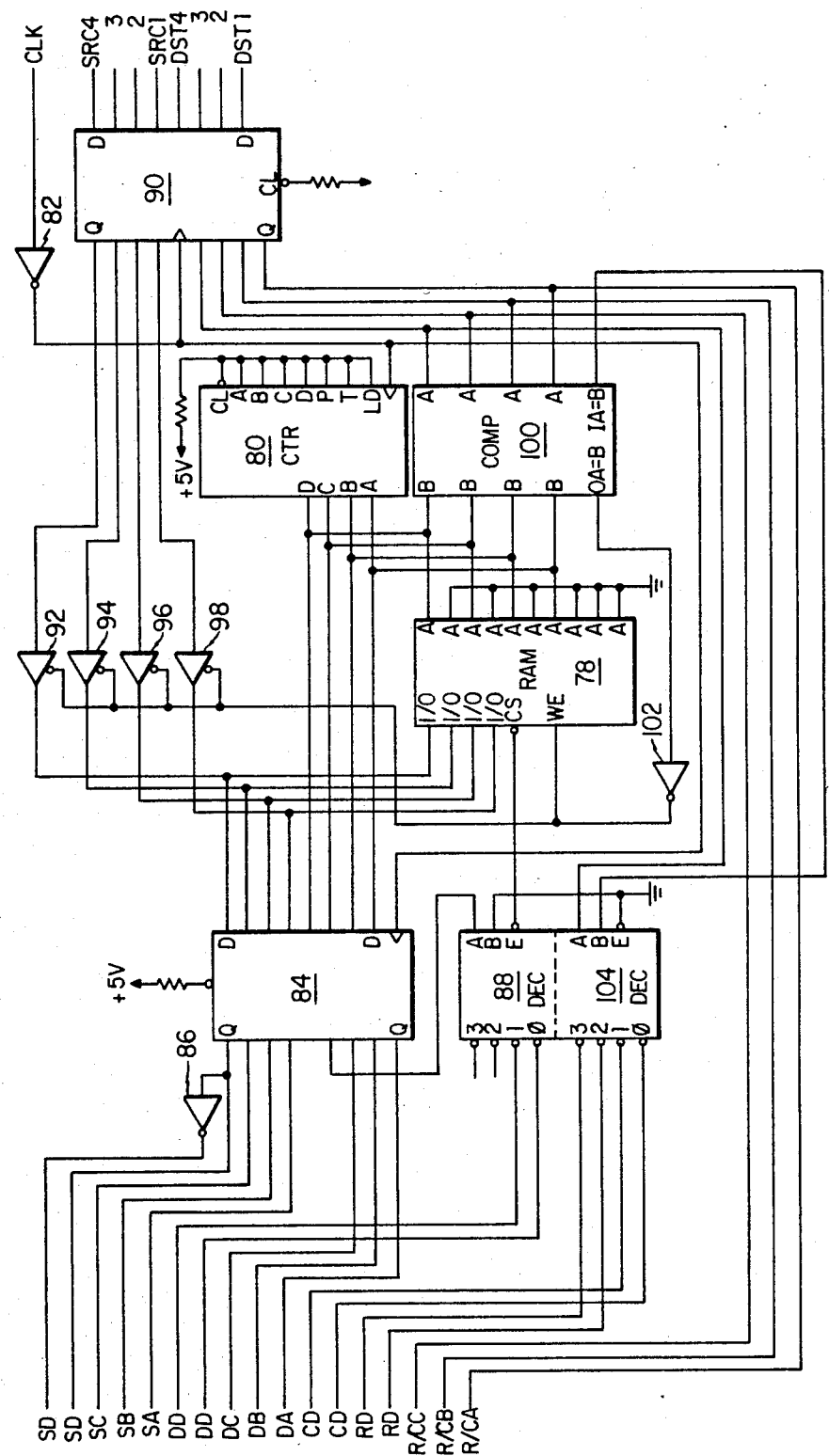
FIG. 5 illustrates a schematic diagram of the control logic board for the multiplexer.

Referring now to FIG. 5, there is illustrated a schematic diagram of the control logic circuitry 36. The control logic circuitry 36 includes a random access memory (RAM) 78 that stores the connection pattern. This pattern is determined by sixteen four-bit words that are stored at select locations within the RAM 78. By selectively outputting these words in association with a particular sample period, the correct communication links can be made.

A 4-bit binary counter 80 has the clock input thereof connected to the output of an inverter 82 which has the input thereof connected to a signal line labeled CLK. The CLK signal line is connected to an external clock operating at a three megahertz rate. The 4-bit output of the counter 80 is connected to four address inputs of the RAM 78. The counter counts from zero to fifteen and then resets itself to begin the count cycle over. During one cycle of the counter 80, sixteen address locations in the RAM 78 are selected and the data stored at those sixteen selected address locations output from the RAM 78.

The four outputs of the RAM 78 are connected to the inputs of four D-type flip flops in an octal D-type flip flop 84. All of the flip flops in the D-type flip flop 84 are clocked at the three megahertz clock frequency output from the inverter 82. The associated Que outputs of the D-type flip flops associated with the output of the RAM 78 form the source control word having the bits SA, SB, SC and SD. The fourth bit SD is input to an inverter 86 to form the inverse thereof. As described above, the source control word is input to the select inputs of the multiplexers 60 and 62 which form the receive multiplexer 30. Therefore, as the counter 80 counts from zero to fifteen, a sequence of control words is output from the RAM 78 and clocked through the D-type flip flops 84 to select a particular one of the inputs to the receive multiplexer 30 for connection with the communications link 34. Depending upon the data stored at the particular address locations in the RAM 78, the source control words will vary.

The 4-bit output of the counter 80 is also input to four D-type flip flops internal to the octal D-type flip flops 84 with the associated Que outputs thereof forming the destination control word having the bits DA, DB, DC, and DD. The fourth bit of the destination control word labeled DD is input to one input of a 2-to-4 decoder/demultiplexer 88 with the least significant bit thereof forming the fourth bit of the destination word DD and the second least significant bit forming the inverse thereof. The Enable input of the 2-to-4 decoder 88 is connected to the output of the inverter 82 for the three megahertz clock signal.

In operation, the counter 80 sequences through a counting cycle from zero to fifteen which count is directly correlated with the destination control word. Therefore, the transmit multiplexer 32 has the data on the control link 34 latched through to the outputs thereof in a sequential manner. For each count of the counter 80, an address location within the RAM 78 is addressed and the data contained therein output to form the source control word. The source control word, as described above, selects the receive input that is to be interfaced with the communication link 34. Therefore, a prestored pattern in the RAM 78 defines which input of the receive multiplexer 30 is to be interfaced with which output of the transmit multiplexer 32.

The RAM 78, has the capability of having the source words at the selectable locations therein altered. This in effect allows altering of the connection pattern. In order to accomplish this, an SRC data word is output from the CPU 42 along the signal bus 44 to the control logic circuit 36. This data is a 4-bit word with the first bit labeled SRC1, the second bit labeled SRC2, the third bit labeled SRC3, and the fourth bit labeled SRC4. This word is input to four D-type flip flops in an octal D-type flip flop 90 which has the clock input thereof connected to the output of the inverter 82 to receive the three megahertz clock. The Que outputs associated with the SRC data word are input to four buffers 92, 94, 96 and 98 which have tri-state outputs.

The outputs of the buffers 92-98 are connected to the inputs/outputs of the RAM 78 to allow writing to the address locations therein. In order to write to these locations, the signal on the Write/Enable input of the RAM 78 must be changed. This Write/Enable input is controlled by a 4-bit magnitude comparator 100. The comparator 100 outputs a signal to the input of an inverter 102, the output of which is connected both to the Write/Enable input of the RAM 78 and to the Enable inputs of the buffers 92-98. Therefore, when a Write instruction is received by the RAM 78, the buffers 92-98 are also activated to pass the data on the inputs therethrough.

The comparator 100 has the B inputs thereof connected to the four outputs of the counter 80 and the eight inputs thereof connected to the a 4-bit destination (DST) word with bit one labeled DST1, bit two labeled DST2, bit three labeled DST3 and bit four labeled DST4. The DST control word is output by the CPU 42 to indicate where the SRC data word is to be stored in the RAM 78. The comparator 100 compares the word output by the counter 80 with the DST word and, when they are equal, outputs a Write/Enable instruction.

When the connection pattern is to be altered, the CPU 42 outputs the code for the receiver multiplexer 30 from zero to fifteen in the SRC control word and the associated destination for the transceiver multiplexer 32 in the DST control word. The SRC control word is clocked through the D-type flip flops 90 and input to the buffers 92-98. When the counter 80 cycles through its count to the proper destination address for the RAM 78, a Write/Enable instruction is generated and the data on the input of the buffers 92-98 is passed through to the inputs/outputs of the RAM 78 and also to the D inputs of the D-type flip flops 84 to generate the source control word. Therefore, the CPU 42 does not have to interrupt the multiplexing sequence in order to change the connection pattern but, rather, is synchronized therewith.

The data word on the Que outputs of the D-type flip flops 90 associated with the DST control word input thereto also constitutes the control word for controlling the CST and RST multiplexers 68-74. The bits R/CA, R/CB, and R/CC directly correspond to the Que outputs for the first three bits of the DST word. The fourth bit of the DST word output from the D-type flip flops 90 is input to one input of a 2-to-4 decoder 104 with the other input thereof connected to a WRT signal from the CPU 42. The first bit on the output of the 2-to-4 decoder comprises the CD signal, the second bit comprises the inverse of the CD signal, the third bit comprises the RD signal and the fourth bit comprises the inverse of the RD signal. The outputs of the 2-to-4 decoder, as described above, control the Enable inputs of the multiplexers 68-74 for the RTS and CTS signals.

Figure 6:
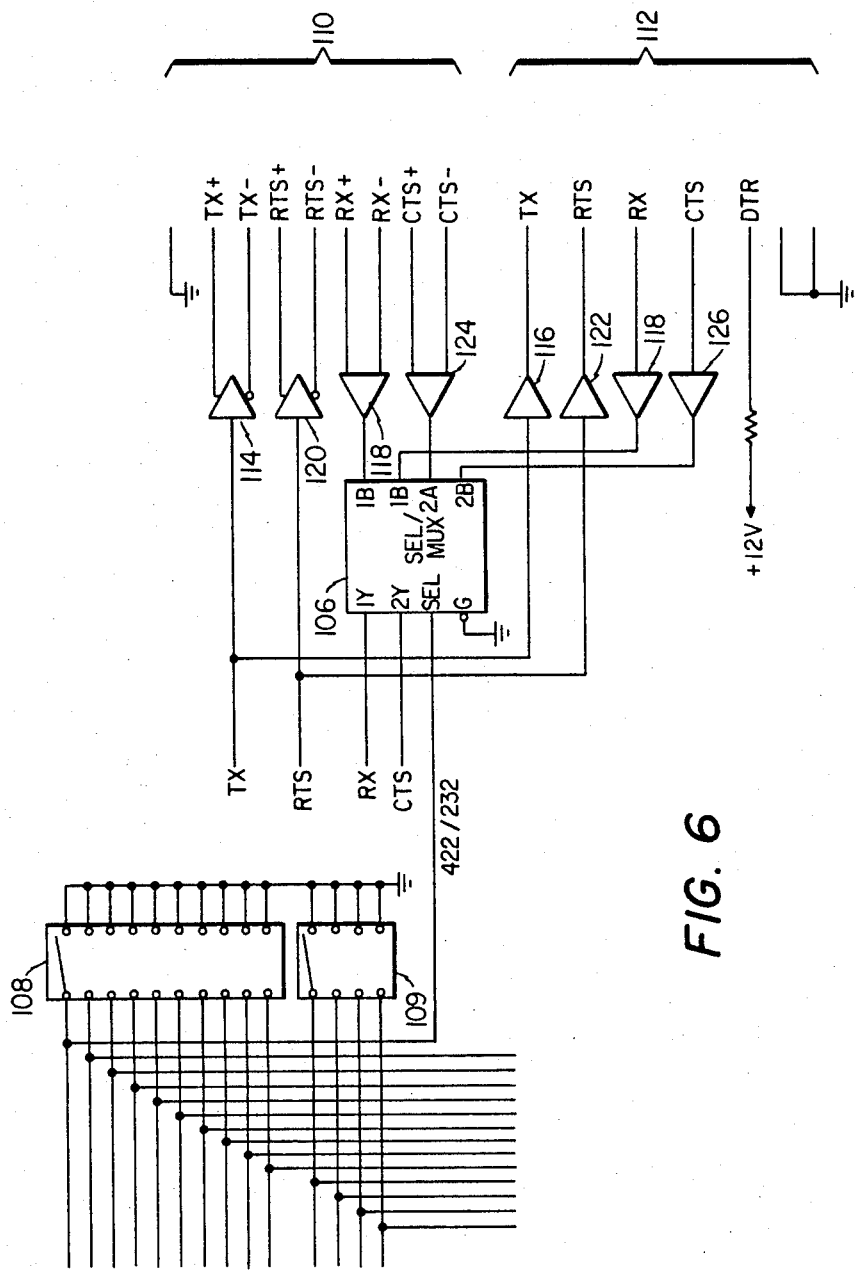
FIG. 6 illustrates one input/output circuit for interfacing with the multiplexer.

Referring now to FIG. 6, there is illustrated a schematic daigram of an input/output circuit for interfacing between one of the peripheral units in the network and the inputs of the receive multiplexer 30 and the outputs of the transmit multiplexer 32. For simplicity purposes, only one of these input/output circuits is illustrated. This input/output circuit is operable to select between two protocols for the network. One protocol is the RS-232 standard and the other is the RS-422 standard. In order to select between the two protocols, a quadruple 2-line-2-1-line data selector/multiplexer 106 is provided and this has a select input that is connected to the input of a Dual in line switch 108 that provides the capability of manually selecting which type of protocol is utilzed. The multiplexer 106 switches signal flow to either a connector 110 or a connector 112. For each input/output circuit, one output of the transmit multiplexer is connected to the connector 110 through a line driver 114 and to the connector 112 through a line driver 116. The receive inputs of the receive multiplexer 30 are connected to the connector 110 and the connector 112 through the multiplexer 106 which receives the inputs from the connector 110 through a line driver 118 and from the connector 112 through a line driver 120. The RTS signal is input to the connector 110 through a line driver 120 and to the connector 112 through a line driver 122. The CTS signal line is interfaced with the connector 110 and the connector 112 through the multiplexer 106. The multiplexer 106 is interfaced with the connector 110 and the incoming CTS signal through a line receiver 124 and with the incoming CTS signal from the connector 112 through a line in the receiver 126. With proper selection of the switch 108, the proper protocol can be selected.

Figure 7:
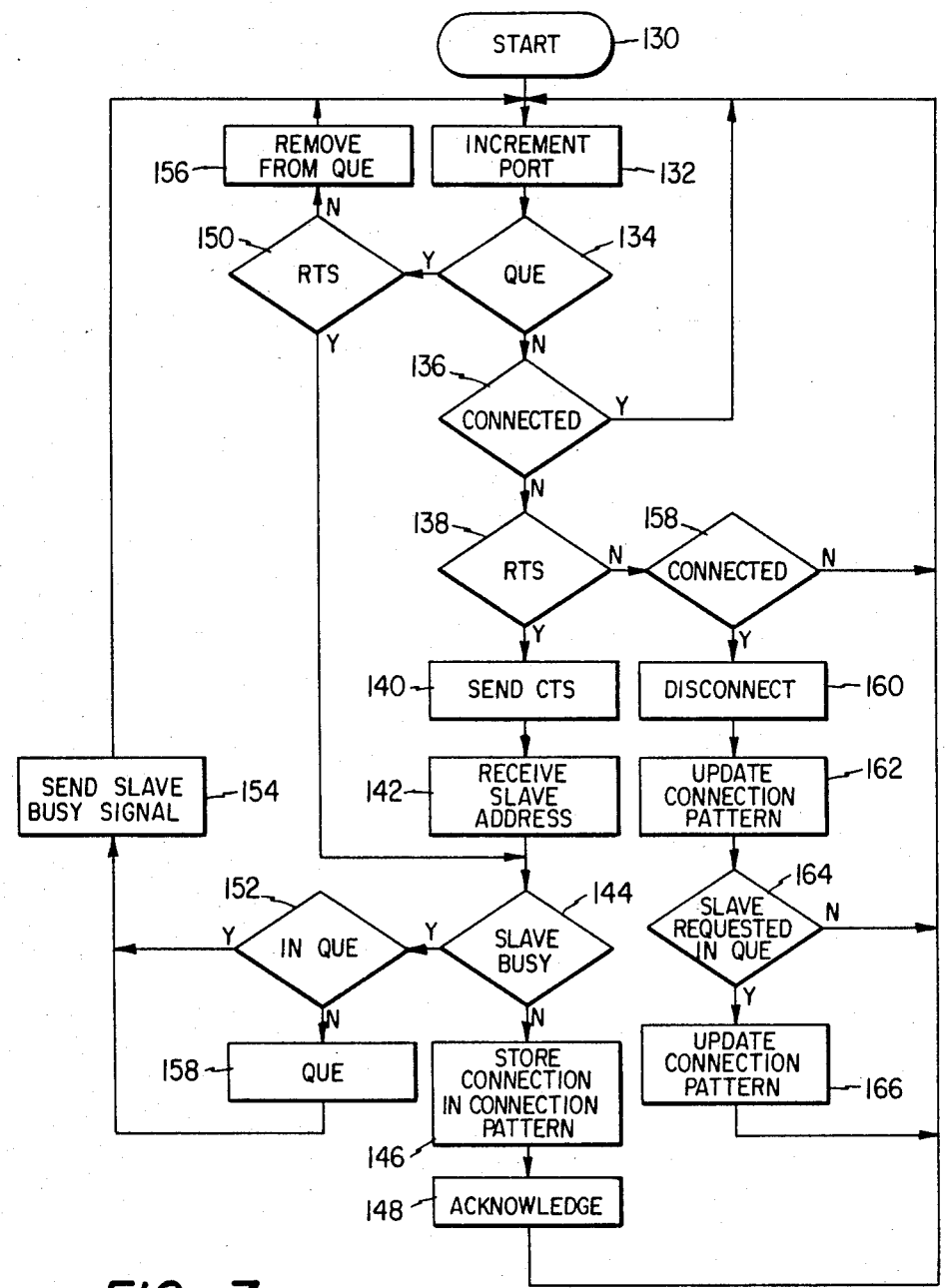
FIG. 7 illustrates a flow chart for the system operation.

Referring now to FIG. 7, there is illustrated a flow chart for the CPU 42 illustrating the detailed operation of the system multiplexer 10. The program is initiated at a START block 130. The program then flows to a FUNCTION block 132 in which the sampled port is incremented. A port is a number stored in software which is indicative of the terminal on the input of the receive multiplexer 30 to which it is being interfaced. The CPU 42 sequentially steps through each of these ports to determine if an RTS signal is present or if the device connected to a particular port is stored in Que. If necessary, the connection pattern is updated or the next port is sequentially sampled.

After incrementing the port in the function block 132, the program flows to a decision block 134 to determine if the particular port is in the Que. If the port is not in Que, the program proceeds along the "N" path to a decision block 136 to determine whether the port is already connected to a slave device. If the port is not connected, the program flows along the "N" path to a decision block 138 to determine if the RTS signal is present. As described above, the RTS signal is generated to indicate to the system multiplexer 10 that a particular device acting as a master has data to send. If no RTS signal is present, the program proceeds along the "N" path thereof to the input of the function block 132 to increment to the next port.

If the RTS signal is present, the program proceeds along the "Y" path to a function block 140 wherein the CTS signal is sent back to the requesting peripheral device. Once the CTS signal is sent, the program flows to a function block 142 to receive the slave address from the requesting peripheral device. The program then flows to a decision block 144 to determine whether the slave that is requested is busy. If the slave is not busy, the program flows along the "N" path to a function block 146 and the new connection data is stored in the connection pattern. The program then flows to a function block 148 to send an acknowledge signal to the requesting peripheral device to indicate that the connection has been made and then the program flows back to the input of the function block 132 to increment the port number and sample the next sequential port.

If the sample port has been placed in Que, the program flows along the "Y" path the from decision block 134 to a decision block 150 to determine if the RTS signal is present. As long as the peripheral device that is in Que wishes to remain in Que, it maintains the RTS signal. If, however, the peripheral device does not wish to wait for a particular slave device, the RTS signal is removed. If the RTS signal is determined to be present in the decision block 150, the program flows along the "Y" path to the input of the decision block 144 to determine whether the slave is still busy. If the slave is still busy, the program flows along the "Y" path to a decision block 152 to determine whether the port is already in Que. If the port is in Que, the program proceeds along the "Y" path to the input of the function block 132 to increment the port number and sample the next sequential port.

If the port is in Que and the RTS signal has been removed, the program flows from the decision block 150 along the "N" path to a function block 156 to remove the port from Que. The program then flows back to the input of the function block 132 to increment the port. When a peripheral device has been placed in Que, it may not desire to wait for the desired slave peripheral to become free. In this situation, the peripheral device merely removes the RTS signal and when the software samples this port, the peripheral is removed from Que.

To place a port in Que, the program flows from the decision block 152 along the "N" path thereof to a function block 157 to place the device in Que. When placing a peripheral device in Que, the priority of that peripheral device must be determined. For example, the master computers 12, 14 and 16 all have different priorities. If master computer 16 having a priority of three is already in Que and the master computer 12 having a priority of one requests the same busy slave device, the master computer 12 is placed in Que ahead of the master computer 16 according to the relative priority. After the particular peripheral device has been Qued, the program flows from the function block 158 to the input of a function block 154 to send a "Slave Busy" signal to the requesting peripheral.

If the peripheral device occupying a particular port is not in Que and an RTS signal is not present, the program flows along the "N" path from the decision block 136 to a decision block 158 to determine if an RTS signal is present. If the RTS signal is presented, the program flows along the "Y" path back to the input of the function block 132 to increment the port number. If, however, the RTS signal has been removed, the program flows from the decision block 158 along the "N" path thereof to a function block 160 to disconnect the port and then to a function block 162 to update the connection pattern. After updating the connection pattern, the program flows to a decision block 164 to determine whether the slave that was connected has a request stored in Que. If a request is not stored in Que, the program flows along the "N" path back to the input of the function block 132 to increment the port number. If, however, the particular slave has a request waiting in Que, the program proceeds along the "Y" path to a function block 166 to update the connection pattern and then back to the input of the function block 132 to increment the port. In this manner, the slave is immediately connected with the particular device in Que without having to cycle one more time to all of the ports. If this update in the function block 166 were not performed, a possibility exists for a requesting peripheral device to be connected prior to sequencing to the requesting device.

Once a master device is connected to a slave device, an internal timer in the CPU 42 times the duration of time that the connection is affected. Since failure of a peripheral device may cause continuous transmission which is undesirable, this timer forces a disconnection after a predetermined duration of time since it assumes that this excessive transmission of data is a failure.

In summary, there has been provided a communications network that utilizes a time domain multiplex switching network that operates in accordance with a predetermined connection pattern. This connection pattern is determined by a central processing unit that interfaces through control logic circuitry with the multiplex circuit. The CPU determines request signals from transmitting lines of peripheral devices in the communications network and checks the status on the requested devices. If the requested devices are free, the CPU alters the connection pattern such that the appropriate devices are connected together in a time domain multiplex manner. By utilizing time domain multiplexing, communication can be achieved in real time.

Although the preferred embodiment has been described in detail, it should be understood that various changes, substitutions and alterations can be made therein without departing from the spirit and scope of the invention as defined by the appended claims.

What is claimed is:

1. A communications network, comprising:
   a plurality of peripheral communication receiving devices for receiving and processing data;
   each of said receiving devices having means for transmitting a status signal indicating if a connection is present;
   a plurality of peripheral communication transmitting devices for transmitting data to a select one of said receiving devices
   each of said transmitting devices having means for transmitting a status signal indicating the presence of data ready for tansmitting to one of said receiving devices and for receiving a clear to send signal indicating that data can be transferred to said receiving device, said transmitting device transmitting data in response to receiving said clear to send signal;
   a signal data highway for carrying said transmit data in a time domain multiplexed format;
   multiplexing means having a plurality of input ports interfaced with said transmitting devices and a plurality of output ports interfaced with said receiving devices for receiving the transmit data from all of said transmitting devices and routing it to select ones of said receiving devices over said data highway by time domain multiplexing in accordance with a connection pattern; and
   control means for controlling said multiplexing means to interface the transmit data to the select ones of said receiving devices over said data highway in accordance with said connection pattern, said control means having:
   means for sampling said transmitting device status signals to determine if data is ready to be transmitted,
   means for receiving at said control means said transmit data in response to receiving said transmitted device status signal indicating data to be transmitted to one of said receiving devices to determine from said transmit data which of said receiving devices is to be interfaced with particular ones of said transmitting devices, said transmit data received by said receiving means having destination information contained therein,
   means for sampling said receiving device status signals to determine if a connection is present,
   means for generating a connection pattern in accordance with said destination information received by said receiving means, said connection pattern indicating the ones of said receiving devices to be connected to said transmitting devices,
   connecting means for connecting said multiplexing means in accordance with said conneciton pattern such that said multiplexing means operates independent of said control means until said control means updates said latch means and
   means for transmitting said clear to send signal to said transmitting device to indicate a connection if the select one of receiving devices is not connected.

2. The communications network of claim 1 and further comprsing means for Queing said transmitting devices having status signals indicating data ready to be transmitted when the desired one of said receiving devices has a status signal indicating a conection with another one of said transmitting devices.

3. The communications network of claim 1 wherein each of said transmitting devices has a relative priority to the remaining ones of said transmitting devices.

4. The communications network of claim 1 wherein said control means further comprises means for timing the duration of the interface between one of said transmitting devices and a selected one of said receiving devices such that a fault in one of said transmitting devices due to continued transmission is detected.

5. The communications network of claim 1 wherein said control means further comprises means for sampling said transmit status signals to determine when said transmission is terminated such that said means for generating said connection pattern can alter said connection pattern in response thereto in accordance with predetermined criteria.

6. The communications network of claim 1 wherein said mulltiplexing means comprises:
   an input time domain multiplexer for multiplexing said transmitted data on said data highway from the transmitting ones of said transmitting devices;
   an output time domain demultiplexer for demultiplexing said received data from said data highway to the select ones of said receiving devices;
   storage means for storing said connection pattern; and
   interface means for interfacing said storage means with said input and output time domain multiplexers such that said time domain multiplexers operate in accordance with said connection pattern;
   said connection pattern alterable in response to said connection means in said control means.

7. The communications network of claim 1 wherein said control means comprises a central processing unit.

8. A communications network, comprising:
   a plurality of slave communication devices for receiving and processing data, each of said slave devices having means for indicating busy status;
   a plurality of master communication devices for receiving and transmitting data, each of said master communication devices prioritized with respect to each other, each of said master devices having means for indicating busy status when receiving data and means for indicating request status when data is ready for transmission, said master devices transmitting data in response to receiving a clear to send signal;
   a single data highway for carrying multiplexed data from a transmitting one of said master devices to a receiving one of either said slave or master devices;
   a time domain multiplexer having a plurality of inputs and a plurality of outputs, said time domain multiplexer operable to time domain multiplex each of said inputs to any of said outputs along said data highway within one time domain multiplex frame in accordance with a connection pattern;

storage means for storing said connection pattern;

interface circuitry for addressing said storage means and receiving said connection pattern for input to said time domain multiplexer to control the connections between the inputs and outputs of said time domain multiplexer;

central processing means interfaced with said multiplexing means for receiving data therefrom and transmitting data thereto for determining said connection pattern, said central processing means having:

means for receiving said transmission status signals from said master units, means for receiving said busy status signals from said master and slave devices, means for altering said connection pattern in said storage means to selectively receive data from the requesting ones of said master units, the information received having destination information contained therein, means for altering said connection pattern in said storage means in response to receiving said destination information and said receive status signals indicate not busy, and means for sending a clear to send signal to said master device to indicate that a connection is provided to the select one of said slave or master devices; and latching means for latching said stored connection pattern on the input of said storage means for storage therein such that said time domain multiplexer operates at a speed independent of said central processing unit but dependent on said connection pattern.

9. The communications network of claim 8 and further comprising means for timing the duration of a connection between one of said master devices and one of said slave devices such that an excess in connection time can be determined.

* * * * *